March 13, 1956  J. H. SCHULMAN ET AL  2,738,430
HIGH ENERGY RADIATION DOSIMETER
Filed Feb. 6, 1953
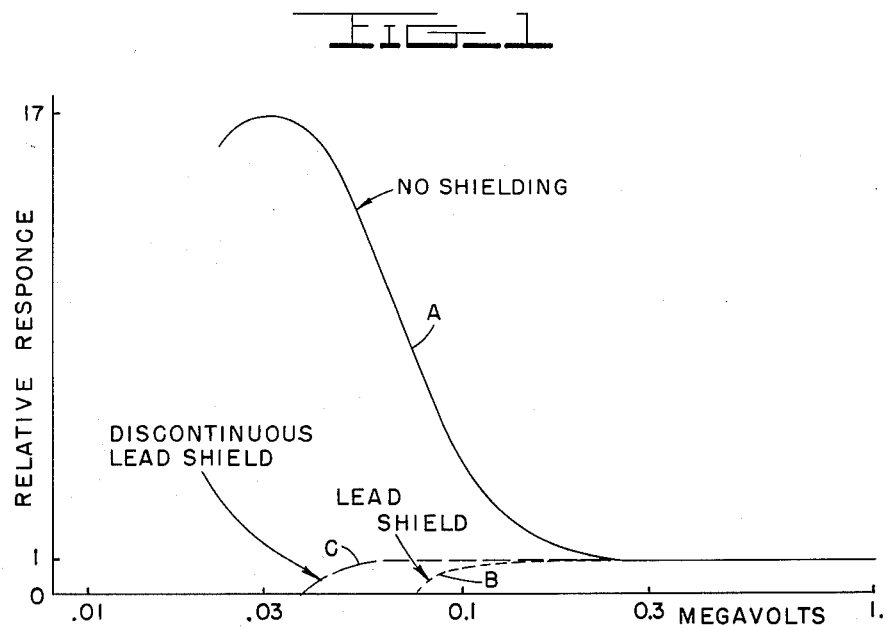
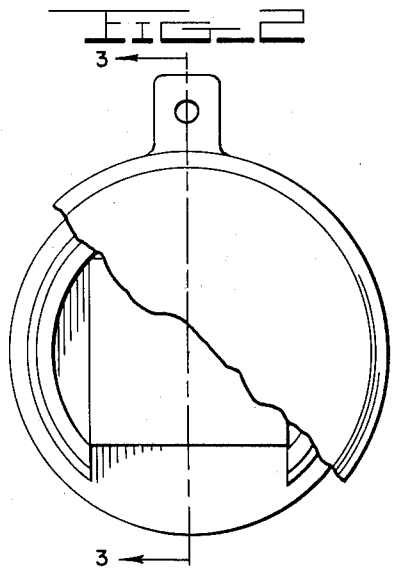
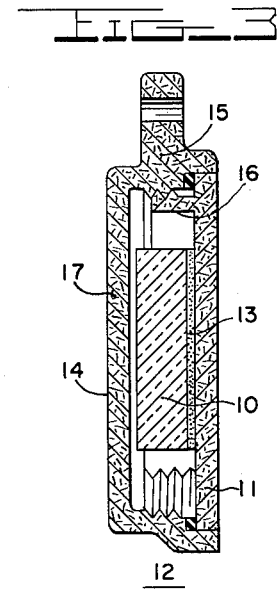
INVENTORS
JAMES H. SCHULMAN
CLIFFORD C. KLICK
BY
ATTORNEYS 200,738,430

Patented Mar. 13, 1956

2,738,430

HIGH ENERGY RADIATION DOSIMETER

James H. Schulman and Clifford C. Klick, Washington, D. C., assignors to the United States of America as represented by the Secretary of the Navy Application February 6, 1953, Serial No. 335,613

7 Claims. (Cl. 250—83)

(Granted under Title 35, U. S. Code (1952), sec. 266)

The present invention relates in general to dosimetry of high energy radiation such as X-rays, gamma rays or radiation from radioactive or fissionable material. More particularly the invention relates to a dosimeter of the portable type, such as may be worn by personnel likely to be exposed to radiation of the above type.

An object of the invention is the provision of a high energy dosimeter capable of being produced in quantity at low cost and with a high degree of uniformity of sensitivity.

Another object is the provision of a dosimeter having a detector element and novel simplified cooperating compound filter element therefor constructed to form a rugged durable and highly stable dosimeter.

A further object is the provision of a minimum number of parts to be assembled and requiring a minimum amount of skill and labor in its production.

Various other objects and advantages of the invention will become apparent from a perusal of the following specification and the drawings accompanying the same.

Fig. 1 is a characteristic curve of a specimen of silver activated phosphate glass showing intensity of fluorescent luminescence versus effective energy in megavolts, with energy plotted logarithmically.

Fig. 2 is a front plan view of a preferred embodiment of the invention with the cover element partly broken away.

Fig. 3 is a vertical section taken on the line 3—3 of Fig. 2, with the cover element in place.

The invention is directed to means for effectively utilizing for dosage measurement of high energy radiation, a dosage detecting element capable of affording an indication of the average or integrated value of different degrees of change proportional to dosage recorded in different portions, but normally unsatisfactory because of an unduly high sensitivity to irradiation in the region of low X-ray energies as compared with that of the higher X-ray energies or gamma rays. Such a detecting element is exemplified in an element composed of silver activated phosphate glass which substance has the quality of becoming fluorescent under ultraviolet light as a result of exposure to high energy radiation, with a degree of luminescense proportional to the dosage of high energy irradiation. Silver activated phosphate glass is desirable because of its stability, reproducibility and relatively low cost, but has the disadvantage of being unduly sensitive to the so called soft X-rays of the order of 30,000 to 200,000 electron volts effective, as compared with its sensitivity to radiation of the order of 200,000 to 3,000,000 electron volts effective, or gamma rays. The characteristic of a specimen of this type of glass is depicted in Fig. 1 in which the solid line A is a graph showing sensitivity of the glass to radiation of different effective energies. From this graph it will be realized how much greater is the response to irradiation in the region of low X-ray energies than in the region of the higher energies. A suitable base glass is one consisting of $Al(PO_3)_3$, 50 percent; $Ba(PO_3)_2$, 25 percent; $KPO_3$ 25 percent. Into this base glass is incorporated up to 16 percent $AgPO_3$.

It has been found that the use of a lead shield of a thickness of about .040 to .050 of an inch will bring the left hand end of the curve of Fig. 1 down to the form indicated by the dotted line B, but has the disadvantage of cutting off too large a portion of the softer rays, and that this disadvantage may be substantially remedied by leaving a small portion or portions unshielded or free of the lead shielding, leaving only such very slight shielding against a radiation source as provided by the intervening atmosphere. The improved effect of a discontinuous lead shield is indicated in Fig. 1 by the dash line C.

The above improvements are most readily attained in a very practical manner in the novel dosimeter structure to be now described.

Referring to Figs. 2 and 3 of the drawings, here the detector element 10, a slab of silver activated phosphate glass, of a size about three fourths, by three fourths, by three sixteenths of an inch, is mounted in the base portion 11 of a casing 12 as by a film 13 of suitable adhesive. A cover element 14, which completes the casing, is secured to the base through threaded engagement of its inner cylindrical wall portion 15 with the outer cylindrical wall portion 16 of the base element 11.

The body material of the casing 11 which may be of any solid material substantially transparent to high energy radiation, in the present instance a plastic opaque to visible light, has substantially evenly dispersed therein portions of a filtering material 17. These portions of filtering material may be of one or more different kinds. A preferred kind is finely divided lead or a lead compound. The particles of lead or lead compound being evenly dispersed throughout the body material of the casing provides certain areas of the glass detector element 10 with a shielding of lead while leaving other portions unshielded, both shielded and unshielded portions being substantially evenly distributed. Thus with the walls of the casing of substantially uniform thickness as shown, the dosimeter response will be independent of direction. For special purposes filters of totally different kinds can be used, say compounds of lower atomic weight elements, which might have more desirable low energy cut-off characteristics than lead. Mixtures of such compounds with heavier compounds such as lead salts can be made, which may have more desirable shielding characteristics. Mixtures of particles of heavy and light metals such as lead and aluminum may be used. In any case the wall thickness and distribution of shielding material should be substantially uniform.

While one specific embodiment of the invention has been shown and described herein for the purpose of disclosure, it is to be understood that the invention is not limited to such specific embodiment but contemplates all such modifications and variants thereof as fall fairly within the scope of the appended claims.

The invention described herein may be manufactured and used by or for the Government of the United States of America for governmental purposes without the payment of any royalties thereon or therefor.

What is claimed is:

1. A dosimeter for high energy radiation comprising a radiation detector element in the form of a solid slab of silver activated phosphate glass having a relatively high sensitivity to relatively soft X-rays of the order of 30,000 to 200,000 electron volts effective and relatively lower sensitivity to radiation of from 200,000 to 3,000,000 electron volts effective, a casing for the detector element formed of material substantially transparent to high energy radiation, and shielding means comprised of spaced discrete particles of shielding material substantially uniformly dispersed in predetermined concentration about the detector element, whereby to provide numerous substantially evenly distributed shielded and unshielded portions around all sides of the slab-shaped detector.

2. A dosimeter as claimed in claim 1 in which the shielding material is finely divided metallic lead dispersed in the material of the casing.

3. A dosimeter as claimed in claim 1 in which the spaced particles are particles of a lead compound dispersed in the material of the casing.

4. A dosimeter as claimed in claim 1 in which the shielding means is a combination of spaced particles of different substances each effective in different degree than the others against a different portion of the range of soft radiation from 30,000 to 200,000 electron volts effective.

5. A dosimeter for high energy radiation comprising a radiation detector element in the form of a solid slab of silver activated phosphate glass having a relatively high sensitivity to relatively soft X-rays, a casing for the detector element formed of material substantially transparent to high energy radiation and a shielding element surrounding the detector element consisting of substantially evenly distributed spaced particles of material absorbing the soft X-rays to a higher degree than the hard rays.

6. A dosimeter as claimed in claim 1 in which the shielding element consists of substantially evenly distributed separate particles of material capable of absorbing substantially all soft X-rays directed thereto, together with other substantially evenly distributed separate particles of a material transmitting a large portion of soft rays directed thereto.

7. A dosimeter for high energy radiation comprising a radiation detector element in the form of a solid slab of silver activated phosphate glass having a relatively high sensitivity to relatively soft X-rays, a casing for the detector element formed of a material substantially transparent to high energy radiation, and a shielding element completely surrounding the detector element to shield all six faces of the said solid slab from all directions, said shielding element consisting throughout its surrounding extent of numerous small substantially evenly distributed separate particles of two kinds of materials one substantially transparent to hard rays but capable of absorbing substantially all soft X-rays directed thereto and the other permitting passage of a large portion of said soft X-rays directed thereto, whereby the glass slab is substantially unshielded in all directions from hard rays and uniformly shielded in all directions from all but a definite small portion of the soft X-rays.

References Cited in the file of this patent

UNITED STATES PATENTS

| | | |
|---|---|---|
| 2,216,326 | Smith | Oct. 1, 1940 |
| 2,403,794 | Goldrick | July 9, 1946 |
| 2,483,991 | Wollan et al. | Oct. 4, 1949 |
| 2,496,218 | Kieffer | Jan. 31, 1950 |
| 2,513,805 | Kanne | July 4, 1950 |
| 2,524,839 | Schulman et al. | Oct. 10, 1950 |